Aug. 27, 1957 — R. SURRATT — 2,803,977
SPLIT SHOT ATTACHING DEVICE AND DISPENSER
Filed March 30, 1954
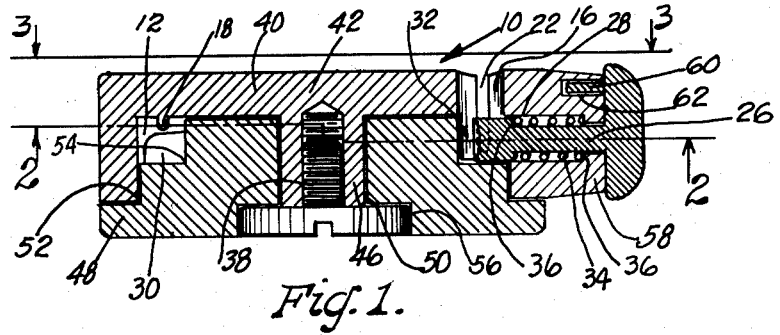
Fig. 1.
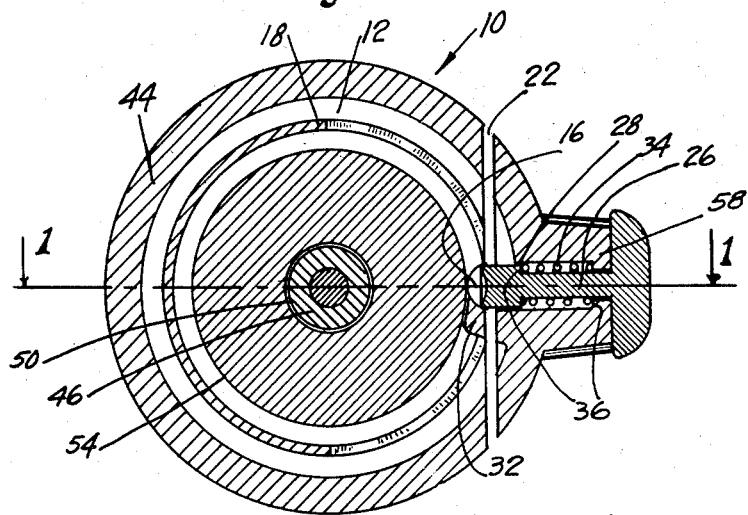
Fig. 2.
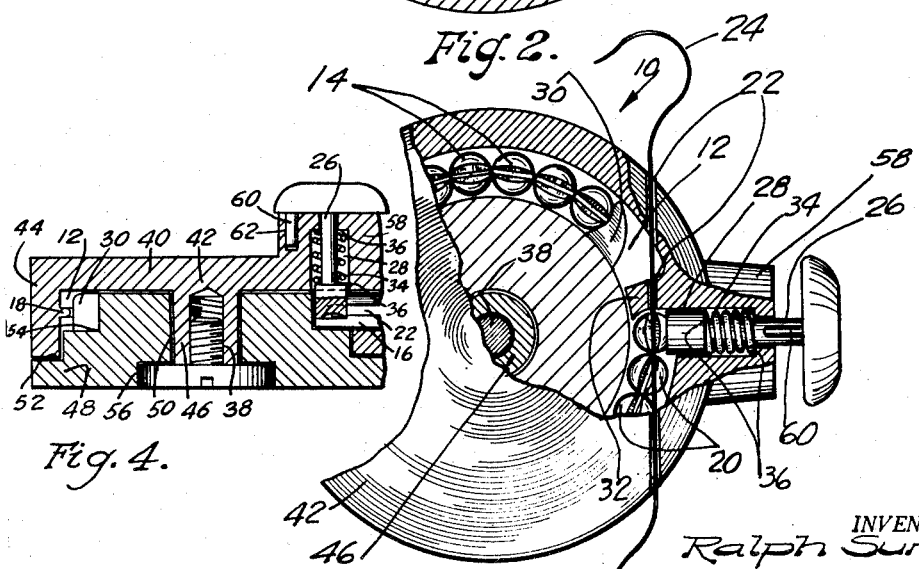
Fig. 4.
Fig. 3.
INVENTOR.
Ralph Surratt
BY
ATTORNEYS

United States Patent Office 2,803,977
Patented Aug. 27, 1957

2,803,977

SPLIT SHOT ATTACHING DEVICE AND DISPENSER

Ralph Surratt, Denver, Colo., assignor, by mesne assignments, to E. R. Wiseman, Boulder, Colo.

Application March 30, 1954, Serial No. 419,780

8 Claims. (Cl. 81—15)

This invention relates to dispensers and more particularly to devices for dispensing split shot of the type used as weights on fishing lines.

A common practice among fishermen is to add one or more split shot to the fishing line or leader adjacent the lure when it is necessary to cast the lure a greater distance or make it sink beneath the surface of the water. The manufacturers of split shot pellets customarily package a number of individual pellets in a small metal box provided with a sliding lid. These containers are quite awkward to use in that it is difficult to get a pellet out of the box without losing several in the process. This problem becomes considerably more acute when one attempts to fasten split shot on his line while standing in the middle of a stream with a fishing rod hooked over his arm so that both hands will be free. Furthermore, these shot are small and often oily making them exceedingly difficult to hold and fasten onto the line or leader and several are usually dropped into the water before one can be crimped in place. Although many fishermen carry a small pair of pliers in their creel or pocket especially for use in fastening split shot onto their lines, a considerable number attempt to crimp the shot in place with their teeth which may result in a broken tooth.

The previously known split shot dispensers generally provide a tube as a container for the shot with a pair of pliers or pincers connected therewith; however, this type of dispenser is bulky and does not eliminate many of the problems mentioned above.

Among the objects of the present invention are to provide; a split shot dispenser by means of which one or more pellets of shot may be affixed in place upon a fishing line or leader without having to touch the shot with the hand; a split shot dispenser of the type described which is small, light, simple to manufacture, inexpensive, and which may be rapidly and conveniently loaded and operated.

Other objects of the invention will be in part apparent and in part pointed out specifically hereinafter in connection with the description of the drawing which follows; and in which, Figure 1 is a diametrical section taken along line 1—1 of Figure 2 showing the split shot dispenser of the present invention;

Figure 2 is a section taken along line 2—2 of Figure 1;

Figure 3 is a top plan view viewed in the direction of arrows 3—3 of Figure 1 with portions broken away to better show the construction, and showing the fishing line or leader and several split shot pellets in place in the dispenser, and, Figure 4 is a diametrical section similar to Figure 1 showing a modification.

Referring now to the drawing, the split shot dispenser that forms the present invention consists basically of a body, indicated in a general way by numeral 10, containing an annular track 12 providing an opening slightly larger in cross section than the cross section of a split shot pellet 14. Several of the split shot pellets are placed in the annular track in contacting relation and discharged from the body one at a time through a discharge opening 16 communicating the annular track with the surface of the body. The body contains an annular rib 18 extending into the annular track and into the slits 20 in the split shot pellets so that the pellets will be guided into the discharge opening with their slits facing outward through the opening in the body. The body contains a slot 22 positioned in alignment with the slit 20 of a split shot pellet in position to be discharged through the discharge opening. This slot communicates with the surface of the body on the same face as the discharge opening and extends laterally on each side of the discharge opening to the outer surface of the body. Thus, a fishing line or leader 24 laid within the slot 22 will extend down into the slit 20 of the split shot pellet in position to be discharged through the discharge opening as shown most clearly in Figure 3. A plunger 26 is mounted for reciprocal movement within a plunger opening 28 which communicates the surface of the body with the annular track and with its axis intersecting the axis of the discharge opening at an angle of approximately ninety degrees. The inner end of the plunger may therefore engage a split shot pellet within the annular track in position to be discharged through the discharge opening at a point approximately perpendicular to the plane of the slit. When the plunger is depressed, the shot pellet will be squeezed between the inner end of the plunger and the opposite wall of the annular track thus closing the slit in the shot pellet around the fishing line 24. The plunger may then be retracted and the fishing line with shot pellet attached lifted out of slot 22 and the discharge opening 16. A follower 30 moves within the annular track and forces the series of shot pellets around the track until a pellet on the opposite end from the follower engages stop 32 which extends across the track adjacent the plunger and discharge openings. A compression spring 34 is positioned on the shaft of the plunger with opposite ends engaging annular abutments 36 on the inner end of the plunger and the outer end of the plunger opening. The compression spring forces the plunger inward into the annular track and in depressed position closes the lower end of the discharge opening and prevents any of the split shot pellets from falling out.

Having thus described the most important features of the shot dispenser of the present invention, it will be well to proceed with the detailed description of certain features found on the preferred embodiment of the invention illustrated in the accompanying drawing.

With particular reference to Figures 1 and 2, it will be seen that the body is generally cylindrical in shape and formed in two sections which are connected together for relative rotational movement by threaded member 38. Fixed body portion 40 consists of a circular plate 42 having an integral annular flange 44 adjacent its outer edge and a central tubular projection 46 threaded to receive threaded member 38. Movable body portion 48 consists of a series of three stepped cylinders having successively shorter diameters and provided with an axial opening 50 by means of which it is mounted for relative rotation with respect to the fixed body portion on the tubular projection 46. Annular flange 44 moves within outer step 52 of the movable body portion and inner step 54 combined with the annular flange and the circular plate of the fixed body portion form the annular track 12. Axial opening 50 is formed with an enlarged portion 56 which bears against the head of the threaded member 38. Follower 30 is preferably formed integral with the movable body portion and extends into the annular track on inner step 54 as shown most clearly in Figure 1. Thus, when the movable body portion is rotated relative to the fixed body portion in a counter-clockwise direction as viewed in Figure 3 it will force the split shot pellets around the annular track until they contact stop 32 or the inner end of the plunger 26, if said plunger is in depressed position. It is to be understood that many different types of followers could be used rather than the one illustrated in the preferred construction. Plunger 26 is mounted within a cylindrical projection 58 which extends outwardly from the surface of the fixed body portion. Discharge opening 16 is also positioned in fixed body portion 40. Annular rib 18 and the discharge opening 16 must both be in either the plate 42 or the annular flange 44 of the fixed body portion and the plunger in the other member.

Figure 4 shows the annular rib 18 and discharge opening 16 in annular flange 44 of the body; whereas, plunger 26 is mounted in plate 42. That is, if the annular track 12 is positioned on the circular plate 42 then the discharge opening must also be in the circular plate and the plunger and plunger opening in the annular flange. It is this last-mentioned construction which has been shown in Figures 1, 2 and 3 of the drawing. The structure shown in Figures 1 through 3 permits the shot dispenser to be laid in the palm of the hand whereupon a great deal of pressure can be applied by the heel of the hand on the plunger to squeeze the shot onto the line. The head of plunger 26 is provided with a pin 60 parallel to the plunger shaft. A pin opening 62 corresponding to pin 60 is positioned in projection 58 and the plunger may be held in retracted position while a shot pellet is being taken from the discharge opening by merely pulling the plunger out and turning it slightly so that the inner end of pin 60 will engage the face of projection 58. The dispenser is normally carried with the inner end of plunger 26 within annular track 12 bearing against the surface of a shot pellet in position to be discharged as shown in Figure 3.

Slot 22 extends across the surface of the fixed body portion, as shown in Figures 2 and 3, in a plane passing through the axis of the discharge opening and tangent to the circle described by the annular rib. The slot is deep enough to permit the fishing line or leader 24 to enter the bottom of slit 20 in the split shot pellet which is to be taken from the dispenser and, it may extend down to inner step 54 of the movable body portion. Several other equivalent means may be used to connect the movable body portion to the fixed body portion for relative rotation other than threaded member 38. Member 38 may be provided with any of a number of well known types of friction latches instead of the threaded portion. The dispenser may be loaded either through the discharge opening 16 with the plunger in retracted position or the movable body portion can be removed and the shot loaded directly into the fixed body portion.

It is apparent from the above description that many different specific constructions are possible while maintaining the important features of the present invention.

It will thus be seen that the many useful objectives for which the shot dispenser of the present invention was constructed have been achieved, and therefore;

I claim:

1. A device for use in dispensing and fastening split shot pellets of the type having slits therein onto a fishing line comprising: a body; an annular track within the body adapted to receive a plurality of split shot pellets; a discharge opening within the body communicating the outer surface thereof with the annular track; means for guiding split shot pellets lying within the annular track into position in line with the inner end of the discharge opening whereby the slit in said pellets will face outward through said discharge opening comprising an annular rib formed on that inner surface of the body containing the inner end of the discharge opening, said annular rib extending into the annular track and into the slits in the pellets; means for passing a fishing line into the body and into the slit in a split shot pellet lying within the annular track in line with the inner end of the discharge opening comprising a slot in the body intersecting the discharge opening in a plane aligned with the slot in said split shot pellet and communicating the annular track with the same outer surface of the body as the discharge opening; and means for closing the slit in a split shot pellet lying within the annular track in line with the inner end of the discharge opening about a fishing line comprising a plunger mounted for reciprocal movement within the body with its axis intersecting the axis of the discharge opening at approximately a right angle, said plunger being accessible from the outer surface of the body and the inner end thereof movable into the annular track.

2. A device in accordance with claim 1 in which: a compression spring is mounted between spaced abutments on the body and the inner end of the plunger forming means urging the plunger into the annular track.

3. A device in accordance with claim 1 in which: a stop is provided within the annular track alongside the inner end of the discharge opening forming means for positioning a split shot pellet in line with the inner end of said discharge opening; and a follower is mounted for movement within the annular track to force the end split shot pellet against the stop.

4. A device in accordance with claim 1 in which: the plunger moves radially with respect to the annular track.

5. A device in accordance with claim 1 in which: the axis of the discharge opening extends radially with respect to the annular track.

6. A device in accordance with claim 1 in which: said body comprises a fixed body portion and a movable body portion connected together in opposed relation for relative rotational movement; the plunger is mounted for rotation within the fixed body portion; one of the opposed surfaces of the plunger and fixed body portion having a projection thereon which when bearing against the other of said opposed surfaces will hold the plunger in retracted position; and said other opposed surface having an opening therein adapted and positioned to receive the projection when aligned therewith upon rotary movement of the plunger to permit said plunger to be depressed.

7. A device in accordance with claim 1 in which: said body comprises a fixed body portion and a movable body portion connected together in opposed relation for relative rotational movement; the fixed body portion comprises a circular plate having an integral annular flange adjacent its outer edge; said annular flange having the annular rib positioned on its inner surface and containing the discharge opening and slot; and said circular plate containing the plunger.

8. A device in accordance with claim 1 in which: said body comprises a fixed body portion and a movable body portion connected together in opposed relation for relative rotational movement; the fixed body portion comprises a circular plate having an integral annular flange adjacent its outer edge; said circular plate having the annular rib positioned on its inner surface and containing the discharge opening and slot; and said annular flange containing the plunger.

References Cited in the file of this patent

UNITED STATES PATENTS

| | | |
|---|---|---|
| 1,345,708 | Schneider | July 6, 1920 |
| 2,236,224 | Raschkind | Mar. 25, 1941 |
| 2,302,641 | Baron | Nov. 17, 1942 |
| 2,329,385 | Bratz | Sept. 14, 1943 |
| 2,343,339 | Stelzer | Mar. 7, 1944 |
| 2,603,992 | Brown et al. | July 22, 1952 |
| 2,655,062 | Meatte | Oct. 13, 1953 |

FOREIGN PATENTS

| | | |
|---|---|---|
| 724,280 | France | Apr. 25, 1932 |